(12) United States Patent
Kanner et al.

(10) Patent No.: US 9,128,815 B2
(45) Date of Patent: Sep. 8, 2015

(54) CONTROL SYSTEM FOR VEHICLE IN A GUIDEWAY NETWORK

(71) Applicants: Abe Kanner, Mississauga (CA); Norman Chong, Toronto (CA)

(72) Inventors: Abe Kanner, Mississauga (CA); Norman Chong, Toronto (CA)

(73) Assignee: Thales Canada Inc, Toronto, Ontario (CA)

( * ) Notice: Subject to any disclaimer, the term of this patent is extended or adjusted under 35 U.S.C. 154(b) by 179 days.

(21) Appl. No.: 13/740,586

(22) Filed: Jan. 14, 2013

(65) Prior Publication Data

US 2014/0200741 A1 Jul. 17, 2014

(51) Int. Cl.
| G06F 17/00 | (2006.01) |
| B61L 7/06 | (2006.01) |
| B61L 19/06 | (2006.01) |
| B61L 27/00 | (2006.01) |

(52) U.S. Cl.
CPC . *G06F 17/00* (2013.01); *B61L 7/06* (2013.01); *B61L 19/06* (2013.01); *B61L 27/0005* (2013.01); *B61L 27/0038* (2013.01)

(58) Field of Classification Search
CPC .................................................. G06F 17/00
USPC ............................................................ 701/2
See application file for complete search history.

(56) References Cited

U.S. PATENT DOCUMENTS

| 4,735,383 A | 4/1988 | Corrie et al. |
| 5,420,883 A | 5/1995 | Swensen et al. |
| 6,135,396 A | 10/2000 | Whitfield et al. |
| 6,356,822 B1 | 3/2002 | Diaz et al. |
| 6,374,165 B2 | 4/2002 | Oguma et al. |
| 6,474,242 B1 | 11/2002 | Baier et al. |
| 6,694,231 B1 | 2/2004 | Rezk |
| 7,006,796 B1 | 2/2006 | Hofmann et al. |
| 7,263,647 B2 | 8/2007 | Bryant et al. |

(Continued)

FOREIGN PATENT DOCUMENTS

| DE | 10318292 | 11/2004 |
| EP | 1719688 | 11/2006 |

(Continued)

OTHER PUBLICATIONS

International Search Report for corresponding International PCT Application No. PCT/IB2014/058181, dated Apr. 29, 2014.

*Primary Examiner* — Fadey Jabr
*Assistant Examiner* — Yazan A Soofi
(74) *Attorney, Agent, or Firm* — Lowe Hauptman & Ham, LLP

(57) ABSTRACT

A control system for a vehicle in a guideway network including a centralized control system configured to generate a first set of instructions. The control system further includes at least one de-centralized control system configured to generate a second set of instructions. The control system further includes an on-board controller configured to receive the first set of instructions and the second set of instructions during a same time period. The on-board controller is configured to receive the first set of instructions using a first communication technique. The on-board controller is configured to receive the second set of instructions via a second communication technique diverse from the first communication technique. If a discrepancy exists, the on-board controller is configured to execute a least restrictive of the first or second set of instructions. The control system is capable of seamlessly transferring control between the two control systems.

19 Claims, 4 Drawing Sheets

(56) References Cited

U.S. PATENT DOCUMENTS

| | | |
|---|---|---|
| 7,769,544 B2 | 8/2010 | Blesener et al. |
| 8,000,873 B2 | 8/2011 | Kernwein et al. |
| 2005/0099061 A1 | 5/2005 | Hollandsworth et al. |
| 2005/0143874 A1* | 6/2005 | Peltz et al. ............... 701/19 |
| 2007/0162199 A1 | 7/2007 | Katsuta et al. |
| 2010/0091663 A1 | 4/2010 | Takeyama et al. |
| 2010/0118988 A1* | 5/2010 | Smith et al. .............. 375/259 |
| 2011/0245996 A1* | 10/2011 | Orsulak et al. ............. 701/2 |
| 2011/0282525 A1* | 11/2011 | Kraeling et al. ........... 701/19 |
| 2012/0221172 A1* | 8/2012 | Anderson ................... 701/1 |

FOREIGN PATENT DOCUMENTS

| | | |
|---|---|---|
| EP | 1705095 | 11/2007 |
| EP | 1995148 | 2/2011 |
| EP | 2039583 | 8/2011 |
| WO | 2006051355 | 5/2006 |
| WO | 2007060084 | 5/2007 |
| WO | 2012004098 | 1/2012 |

* cited by examiner

CONTROL SYSTEM FOR VEHICLE IN A GUIDEWAY NETWORK

BACKGROUND

A vehicle traveling within a guideway network is connected to a primary control system configured to provide movement instructions to the vehicle. The vehicle also includes a redundant control system configured to provide movement instructions to the vehicle in case the primary control system fails or communication with the primary control system is interrupted. The redundant control system is not activated until a problem arises with respect to the primary control system. In some instances, the redundant control system is manual operation by a driver on-board the vehicle. In some instances, if a problem arises with the primary control system, the vehicle brakes to a stop until the driver can be transported to the vehicle to begin manual operation.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1:
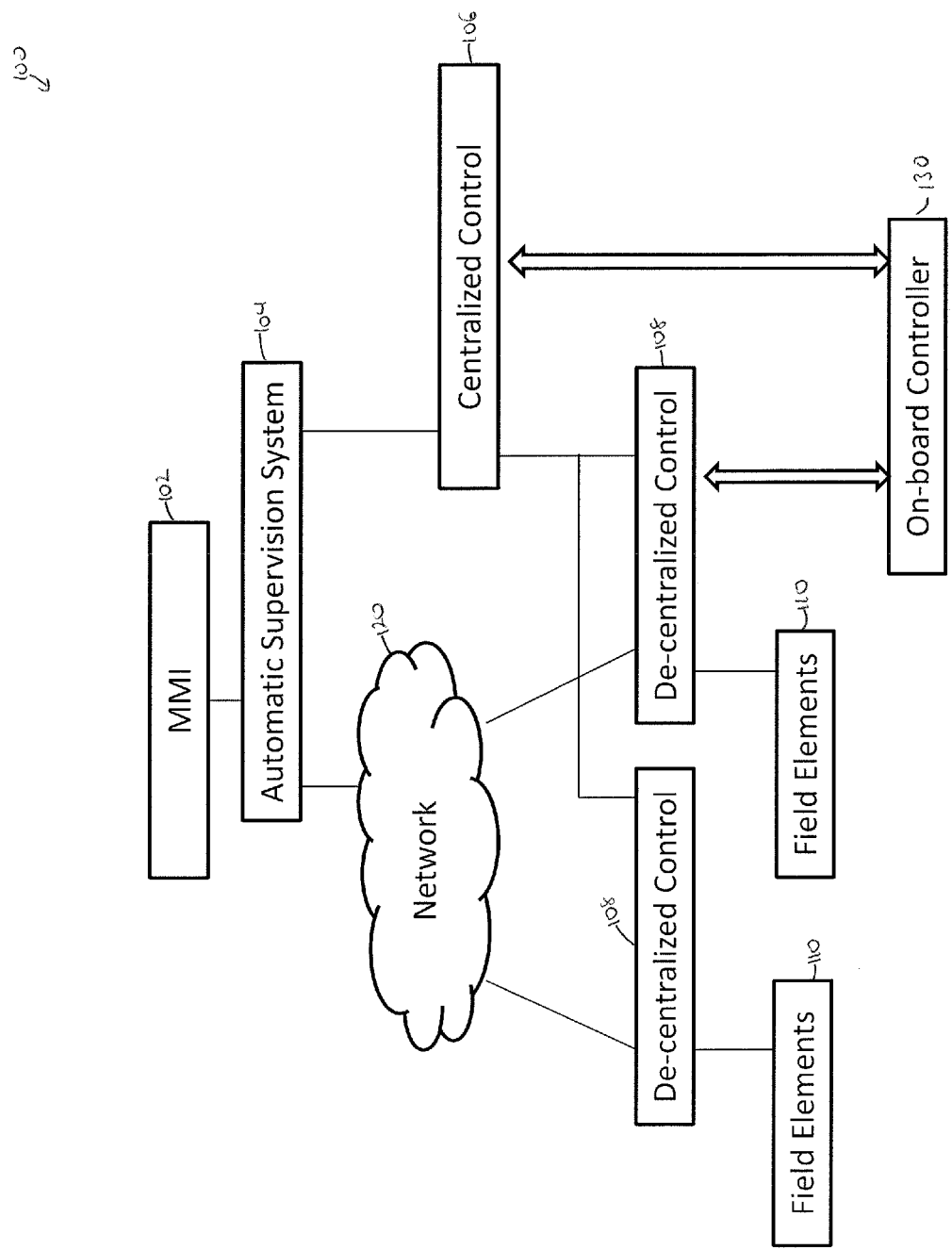
FIG. 1 is a high-level block diagram of a control system for a guideway network in accordance with one or more embodiments.

FIG. 1 is a high-level block diagram of a control system 100 for a guideway network in accordance with one or more embodiments. Control system 100 includes a man-machine interface (MMI) 102 configured to receive instructions from a user and display information regarding the control system to the user. Control system 100 further includes an automatic supervision system 104 configured to provide routing information and provide the interface to the MMI. Control system 100 further includes a centralized control system 106 configured to receive the routing information from automatic supervision system 104. Centralized control system 106 (also called centralized control 106) is configured to calculate a first set of instructions based on the routing information and transmit those instructions to an on board controller of the vehicle in the guideway network. Control system 100 further includes several de-centralized control systems 108 (also called de-centralized controls 108) configured to receive the routing information from automatic supervision system 104. Each de-centralized control 108 is configured to calculate a second set of instructions based on the routing information and transmit those instructions to the on board controller of the vehicle in the guideway network. Control system 100 further includes several sets of field elements 110 configured to detect information regarding the guideway network (e.g. switch position, platform doors statues etc.). Each set of field elements 110 is associated with a respective de-centralized control 108. The respective de-centralized control 108 is configured to calculate the second set of instructions based on information received from the associated field elements 110. De-centralized controls 108 are in continuous communication with centralized control 106 to enable data exchange. Control system 100 further includes a network 120 configured to provide a communication link between automatic supervision system 104 and each de-centralized control 108. Control system 100 also includes an on-board controller 130 connected to the vehicle. On-board controller 130 is configured to simultaneously receive the first set of instructions from centralized control 106 and the second set of instructions from de-centralized control 108. On-board controller 130 is also configured to control the vehicle in response to the received instructions. On-board controller 130 is also configured to provide position information and speed information related to the vehicle motion on the guideway to both the centralized control 106 and de-centralized controls 108.

MMI 102 is configured to enable a user to interact with control system 100 by providing instructions and reviewing information regarding the control system. In some embodiments, MMI 102 includes a display module configured to display information regarding the status of the control system 100 and other relevant information to the user. In some embodiments, MMI 102 includes a keyboard, touch screen, cursor tool or other suitable element for receiving instructions from the user.

Automatic supervision system 104 is configured to provide a data link between centralized control 106 and de-centralized controls 108. Automatic supervision system 104 is configured to receive information from centralized control 106 and de-centralized controls 108. In some embodiments, the received information includes the first set of instructions and the second set of instructions, data from field elements 110, vehicle speed and position information from on-board controller 130 or other suitable information. In some embodiments, automatic supervision system 104 also receives user instructions from MMI 102. Based on the received information, automatic supervision system 104 generates routing information for each vehicle in the guideway network. Routing information includes direction of travel, speed of travel, vehicle destination, vehicle arrival time at the destination, position of switches in the guideway network or other suitable information used to provide instructions to vehicles in the guideway network. In some embodiments, automatic supervision system 104 also provides information to passengers via displays, audible announcements or other suitable communication means. Automatic supervision system 104 is configured to transmit simultaneously the routing information to centralized control 106 and de-centralized controls 108. In some embodiments, the routing information is transmitted wirelessly. In some embodiments, the routing information is transmitted via a wired connection or a network.

Centralized control 106 is configured to receive the routing information from automatic supervision system 104 and data from de-centralized controls 108. Centralized control 106 is also configured to receive vehicle position and speed information from on-board controller 130. In some embodiments, a communication path between centralized control 106 and on-board controller 130 is independent from a communication path between de-centralized controls 108 and the on-board controller. Centralized control 106 is configured to generate the first set of instructions using a first algorithm. The first algorithm is configured to combine the routing information, the information from de-centralized controls 108 regarding the field elements and the information from on-board controller 130 to determine the first set of instructions. In some embodiments, the first set of instructions includes a limit of movement authority (LMA), vehicle speed instructions, switch cross-over instructions or other suitable information. LMA is a maximum distance which the vehicle can safely travel. The first algorithm generates the first set of instructions using a consideration of a wider portion of the guideway network than individual de-centralized controls 108. In some embodiments, a single centralized control 106 is used for an entire guideway network. In some embodiments, centralized control 106 is configured to provide instructions for a portion of the guideway network covering more than one de-centralized control 108. In some embodiments, centralized control 106 is configured to transmit the first set of instructions to on-board controller 130 using inductive loop communication using inductive loops positioned along the guideway network. In some embodiments, centralized control 106 is configured to transmit the first set of instructions to on-board controller 130 using radio communication, microwave communication, optical communication or other suitable communication techniques.

De-centralized controls 108 are configured to receive the routing information from automatic supervision system 104 and vehicle data from field elements 110. Each de-centralized control 108 is also configured to receive vehicle position and speed information from on-board controller 130. Each de-centralized control 108 is configured to independently generate the second set of instructions using a second diverse algorithm. The second diverse algorithm is configured to combine the routing information, the information from field elements 110 and the information from on-board controller 130 to determine the second set of instructions. In some embodiments, the second algorithm is independent from the first algorithm. In some embodiments, the second set of instructions includes LMA, vehicle speed instructions, switch cross-over instructions or other suitable information. The second diverse algorithm generates the second set of instructions in consideration of a smaller portion of the guideway network than centralized control 106. In some embodiments, the LMA from de-centralized control 108 is limited to an area of control of the de-centralized controls. In some embodiments, the area of control for a first de-centralized control 108 overlaps with the area of control for an adjacent second de-centralized control 108. In some embodiments, the overlap is sufficiently large so that on-board controller 130 is able to establish communication with the second de-centralized control prior to exiting the area of control for the first de-centralized control. In some embodiments, de-centralized control 108 is configured to transmit the second set of instructions to on-board controller 130 using radio communication. In some embodiments, de-centralized control 108 is configured to transmit the second set of instructions to on-board controller 130 using inductive loop communication, microwave communication, optical communication or other suitable communication techniques. In some embodiments, the communication technique used by de-centralized control 108 is independent and different from the communication technique used by centralized control 106.

Field elements 110 are configured to collect data about the status of the guideway and transmit the data to a respective de-centralized control 108. In some embodiments, field elements 110 transmit the collected data via a wireless connection with de-centralized control 108. In some embodiments, field elements 110 transmit the collected data via a wired connected with de-centralized control 108. In some embodiments, field elements 110 include axle counters, radio frequency identification (RFID) tag readers, position detectors, switches, platform doors or other suitable elements. In some embodiments, field elements 110 are positioned on a guideway of the guideway network. In some embodiments, field elements 110 are positioned between guideways of the guideway network. In some embodiments, field elements 110 are positioned on a wayside of the guideway.

Network 120 is configured to provide a communication link between each de-centralized control 108 and automatic supervision system 104. In some embodiments, network 120 is a wireless network. In some embodiments, network 120 is a wired network, such as an optical fiber network, an electrically conductive network, or other suitable wired network. In some embodiments, a single network 120 is used to connect all de-centralized controls 108 in the guideway network to automatic supervision system 104. In some embodiments, multiple networks 120 are used to connect different sets of de-centralized controls 108 to automatic supervision system 104. In some embodiments, a number of networks 120 is equal to a number of centralized controls 106.

On-board controller 130 is configured to receive simultaneously the first set of instructions and the second set of instructions. On-board controller 130 is also configured to transmit position information and speed information of the vehicle to both centralized control 106 and de-centralized controls 108. In some embodiments, on-board controller 130 is configured to determine the position of the vehicle using a RFID tags positioned in the guideway network, a global positioning system (GPS), an optical sensor, a map of the guideway network, or other suitable position determining devices. In some embodiments, on-board controller 130 is configured to determine the speed of the vehicle using an accelerometer, a tachometer, a map of the guideway network, RFID tags positioned in the guideway network or other suitable speed determining devices.

On-board controller 130 is configured to implement the first set of instruction or the second set of instructions by sending control signals to an automatic braking and acceleration system. By sending signals to the automatic braking and acceleration system, on-board controller 130 can increase or decrease the speed of the vehicle or bring the vehicle to a complete stop. In some embodiments, on-board controller 130 controls the speed of the vehicle to remain below a maximum speed sustainable by the guideway and to allow the vehicle to come to a complete stop at the LMA. In some embodiments, the vehicle includes multiple on-board controllers 130 for redundancy in case one of the on-board controllers fails.

Control system 100 provides advantages over other control systems because both the centralized control 106 and de-centralized controls 108 are both trusted sources. A trusted source means centralized control 106 and de-centralized controls 108 are safety integrity level (SIL) level 4 based on International Electrotechnical Commission's (IEC) standard IEC 61508, in at least one embodiment. SIL level 4 means the probability of failure per hour ranges from $10^{-8}$ to $10^{-9}$. In some embodiments, on-board controller 130 is also a trusted source. On-board controller 130 is able to rely on information received from centralized control 106 or de-centralized controls 108. Since both centralized control 106 and de-centralized control 108 are trusted sources, on-board controller 130 will implement the least restrictive of the first set of instructions or the second set of instructions, in some embodiments. Implementing the least restrictive set of instructions facilitates more efficient control of movement of the vehicle through the guideway network. Discrepancies in the first set of instructions and the second set of instructions arise as a result of outdated information, user instructions, consideration of different information, differences in the first and second algorithms or other such circumstances. In some embodiments, outdated information results from a delay in transmission of information from field elements 110 to centralized control 106 or a difference in delay of receipt of the routing information from the automatic supervision system 104. In some embodiments, user instructions cause a difference in the received instructions because the user instructions are able to be implemented in centralized control 106 and a de-centralized control 108 with different timing. In some embodiments, consideration of different information results in the difference in the received instructions because the centralized control 106 is aware of information, e.g., movement of another vehicle, outside the area of control of the de-centralized control 108 where the vehicle is located.

An additional advantage of control system 100 is that on-board controller 130 receives the first set of instructions and the second set of instructions continuously. By receiving both sets of instructions continuously, failure of centralized control 106 or de-centralized controls 108 is seamlessly overcome. In this description, seamlessly means continuous receipt of instructions from either centralized control 106 or de-centralized controls 108 without a switch-over delay or without a physical switch-over operation in on-board controller 130. For example, if communication with centralized control 106 is interrupted, e.g., because of a failure of the centralized control or of an element transmitting the first set of instructions to on-board controller 130, the on-board controller will continue to receive the second set of instructions from de-centralized controls 108 without interruption. In contrast, other control systems brake the vehicle to a stop until a driver can be dispatched to the vehicle to resume operation or communication is established with a secondary communication system.

Another advantage of control system 100 is the capability of on-board controller 130 to use two separate communication paths to receive instructions. By receiving instructions using two communication paths, the vehicle can continue operating normally even if one communication system fails. For example, if a radio transceiver of on-board controller 130 fails interrupting communication with de-centralized controls 108, the on-board controller 130 maintains normal operation using the first set of instructions received via the inductive loop communication system. In other control systems using a single communication channel, if communication is interrupted the vehicle is braked to a stop until a driver can be dispatched to the vehicle to resume operation or communication is reestablished.

Figure 2:
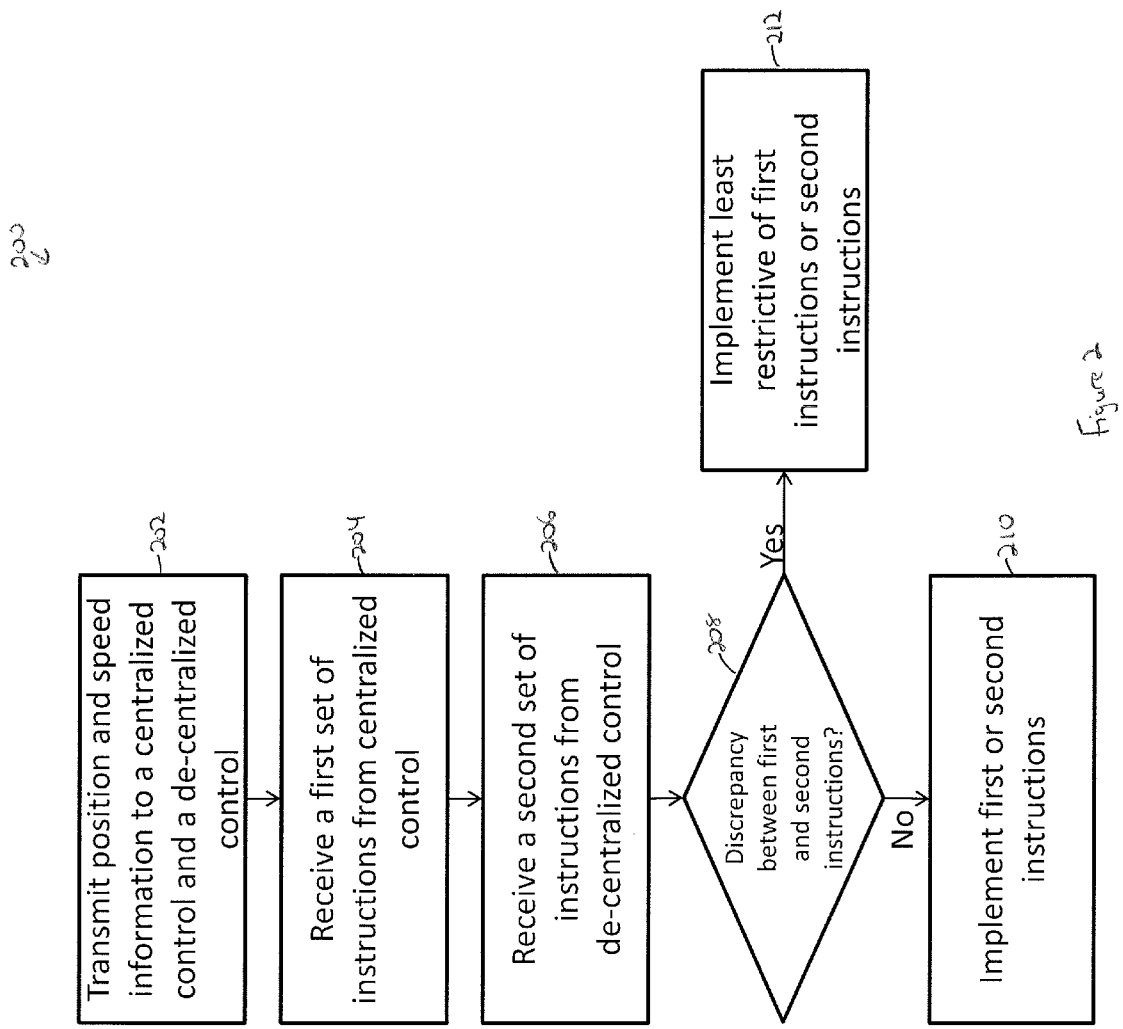
FIG. 2 is a flow chart of a method of operating an on-board controller of a vehicle in the guideway network in accordance with one or more embodiments.

FIG. 2 is a flow chart of a method 200 of operating an on-board controller of a vehicle in the guideway network. In some embodiments, the on-board controller is on-board controller 130 (FIG. 1). Method 200 begins with operation 202 in which the on-board controller transmits simultaneously position and speed information to a centralized control and a de-centralized control. In some embodiments, the position and speed information is transmitted by radio communication, inductive loop communication, microwave communication, optical communication or other suitable communication techniques. The position and speed information is transmitted to the centralized control using a first communication technique. In some embodiments, the position and speed information is transmitted to the de-centralized control using a second communication technique different and diverse from the first communication technique.

In operation 204, the on-board controller receives a first set of instructions from the centralized control. In some embodiments, the on-board control receives the first set of instructions by radio communication, inductive loop communication, microwave communication, optical communication or other suitable communication techniques.

In operation 206, the on-board controller receives a second set of instructions from the de-centralized control. In some embodiments, the on-board control receives the second set of instructions by radio communication, inductive loop communication, microwave communication, optical communication or other suitable communication techniques. In some embodiments, the on-board controller receives the second set of instructions by a different communication technique from the first set of instructions. During normal operation, the on-board controller continuously receives simultaneously both the first set of instructions and the second set of instructions. In some embodiments, operations 204 and 206 are performed simultaneously. In some embodiments, operations 204 and 206 are performed in an alternating fashion. In some embodiments, operations 204 and 206 are performed periodically.

In operation 208, the on-board controller determines whether a discrepancy exists between the first set of instructions and the second set of instructions. In some embodiments, the discrepancy between the first set of instructions and the second set of instruction includes a different in LMA, or a difference in vehicle speed command.

If the on-board controller determines there is no discrepancy between the first set of instructions and the second set of instructions, method 200 continues with operation 210 in which the on-board controller implements the first or second instructions. Since the first set of instructions and the second set of instructions are the same, by implementing one set of instructions, the on-board controller also implements the other set of instructions. In some embodiments, the controller includes a default to implement the first set of instructions in operation 210. In some embodiments, the controller includes a default to implement the second set of instructions in operation 210. In some embodiments, the on-board controller implements the first and second set of instructions by sending signals to an automatic braking and acceleration system to control a speed of the vehicle along the guideways.

If the on-board controller determines there is a discrepancy between the first set of instructions and the second set of instructions, method 200 continues with operation 212 in which the on-board controller implements the least restrictive of the first set of instructions or the second set of instructions. Both the first and second set of instructions are received from trusted sources, so the on-board controller follows the least restrictive set of instructions. In some embodiments, the on-board controller determines the least restriction set of instructions to be the instructions with the greatest LMA distance. In some embodiments, the on-board controller determines the least restrictive set of instructions to be the instructions with the highest vehicle speed. In some embodiments, the on-board controller determines the least restrictive set of instructions to allow the vehicle to continue movement on the guideway. In some embodiments, the on-board controller implements the first and second set of instructions by sending signals to the automatic braking and acceleration system to control a speed of the vehicle along the guideway. If the on-board controller receives instructions from only a single control system, i.e., the centralized control or the de-centralized control, the on-board controller treats the received instructions as the least restrictive instructions and implements the received instructions.

One of ordinary skill in the art will recognize that the order of operations in method 200 is changed, in some embodiments. One of ordinary skill in the art will also recognize that additional operations are added or operations are removed or combined, in some embodiments.

Figure 3:
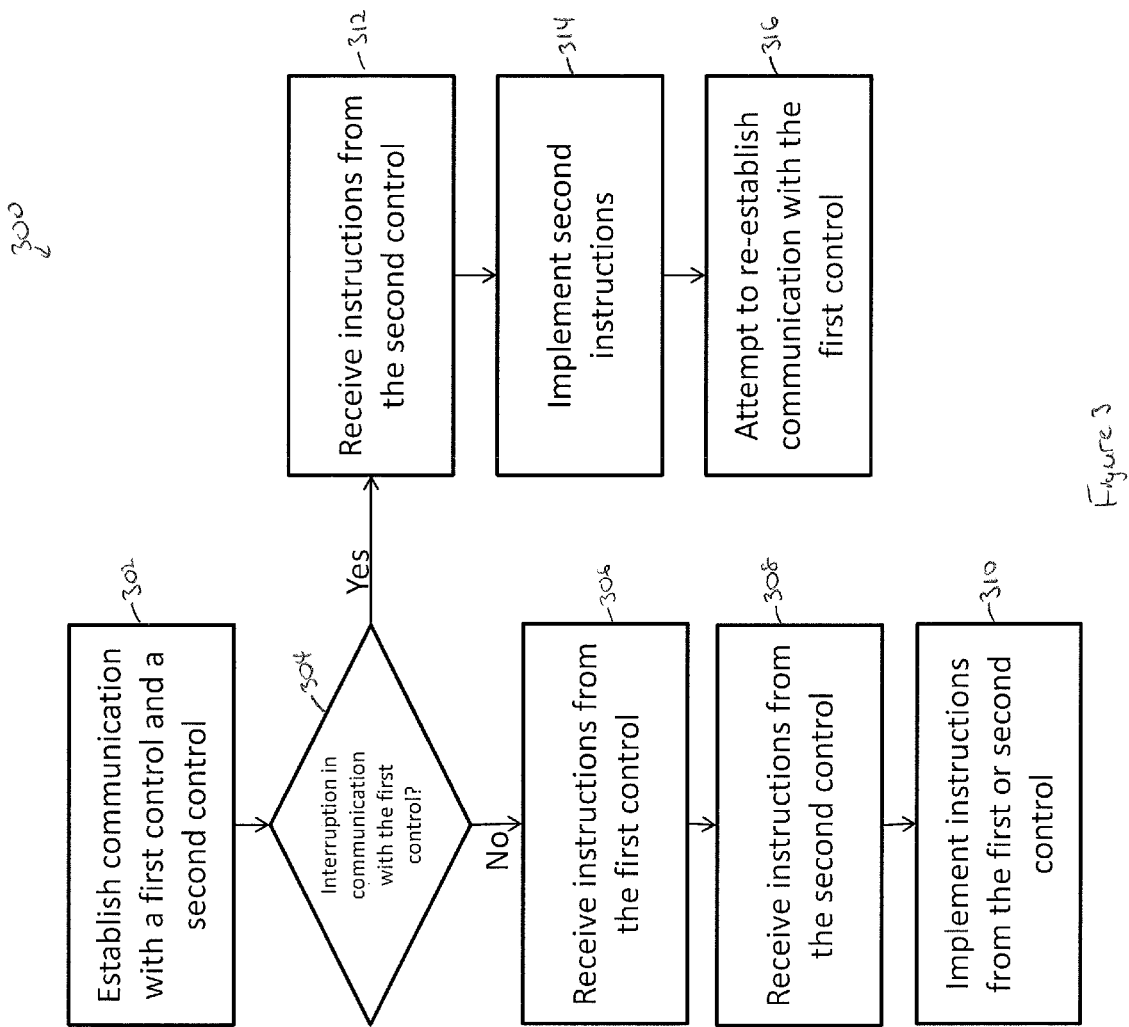
FIG. 3 is a flow chart of a method of operating the on-board controller of the vehicle in the guideway network in accordance with one or more embodiments.

FIG. 3 is a method 300 of operating the on-board controller of the vehicle in the guideway network in accordance with one or more embodiments. In operation 302, the on-board controller establishes communication with a first control and a second control. In some embodiments, the first control is the centralized control and the second control is the de-centralized control. In some embodiments, the first control is the de-centralized control and the second control is the centralized control. In some embodiments, the on-board controller establishes communication with the first control via a different communication technique from communication with the second control. In some embodiments, the on-board controller establishes communication with more than one first or second control at one time, e.g., at an overlap in an area of control of two adjacent de-centralized controls. In some embodiments, communication is established prior to movement of the vehicle along the guideway network. In some embodiments, communication is established while the vehicle is moving in the guideway network. Once communication is established with the first control and the second control, the on-board controller continuously receives instructions from both the first control and the second control.

In operation 304, the on-board controller determines whether there is an interruption in communication with the first control. One of ordinary skill in the art will recognize interruption in communication with the first control is merely an example, and method 300 is capable of being modified to include interruption in communication with the second control. The on-board controller determines an interruption in communication by a cessation in receiving the instructions from the first controller. In some embodiments, the cessation is determined when the instructions are not received for a pre-determined time period. In some embodiments, the cessation is determined when the instructions are not received for a pre-determined number of periodic cycles.

If the on-board controller determines there is no interruption in communication with the first control, method 300 continues with operation 306 in which the on-board controller receives the instructions from the first control. In some embodiments, the on-board control receives the instructions from the first control by radio communication, inductive loop communication, microwave communication, optical communication or other suitable communication techniques.

In operation 308, the on-board controller receives instructions from the second control. In some embodiments, the on-board control receives the instructions from the second control by radio communication, inductive loop communication, microwave communication, optical communication or other suitable communication techniques. In some embodiments, the on-board controller receives the instructions from the second control by a different and diverse communication technique from the instructions from the first control. During normal operation, the on-board controller continuously receives instructions from both the first control and the second control. In some embodiments, operations 306 and 308 are performed simultaneously. In some embodiments, operations 306 and 308 are performed in an alternating fashion. In some embodiments, operations 306 and 308 are performed periodically.

In operation 310, the on-board controller implements the instructions from the first control or the instructions from the second control. In some embodiments, the on-board controller implements the instructions from the first control or the second control by sending signals to the automatic braking and acceleration system to control a speed of the vehicle along the guideways. In some embodiments, the instructions from the first control or the second control are implemented using method 200.

If the on-board controller determines an interruption in communication with the first control exists, method 300 continues with operation 312 in which the on-board controller receives the instructions from the second control. In some embodiments, the on-board control receives the instructions from the second control by radio communication, inductive loop communication, microwave communication, optical communication or other suitable communication techniques.

In operation 314, the on-board controller implements the instructions from the second control. In some embodiments, the on-board controller implements the instructions from the second control by sending signals to the automatic braking and acceleration system to control a speed of the vehicle along the guideways.

In operation 316, the on-board controller attempts to re-establish communication with the first control. In some embodiments, the on-board controller attempts to re-establish communication with the first control by transferring control of the vehicle to a back-up on-board controller to determine whether a failure occurred in the on-board controller. In some embodiments, the on-board controller attempts to re-establish communication with the first control by searching for a signal from the first control. In some embodiments, the on-board controller attempts to re-establish communication with the first control by sending a signal to the first control. In some embodiments, operation 316 is performed continuously until communication with first control is re-established.

One of ordinary skill in the art will recognize that the order of operations in method 300 is changed, in some embodiments. One of ordinary skill in the art will also recognize that additional operations are added or operations are removed or combined, in some embodiments.

Figure 4:
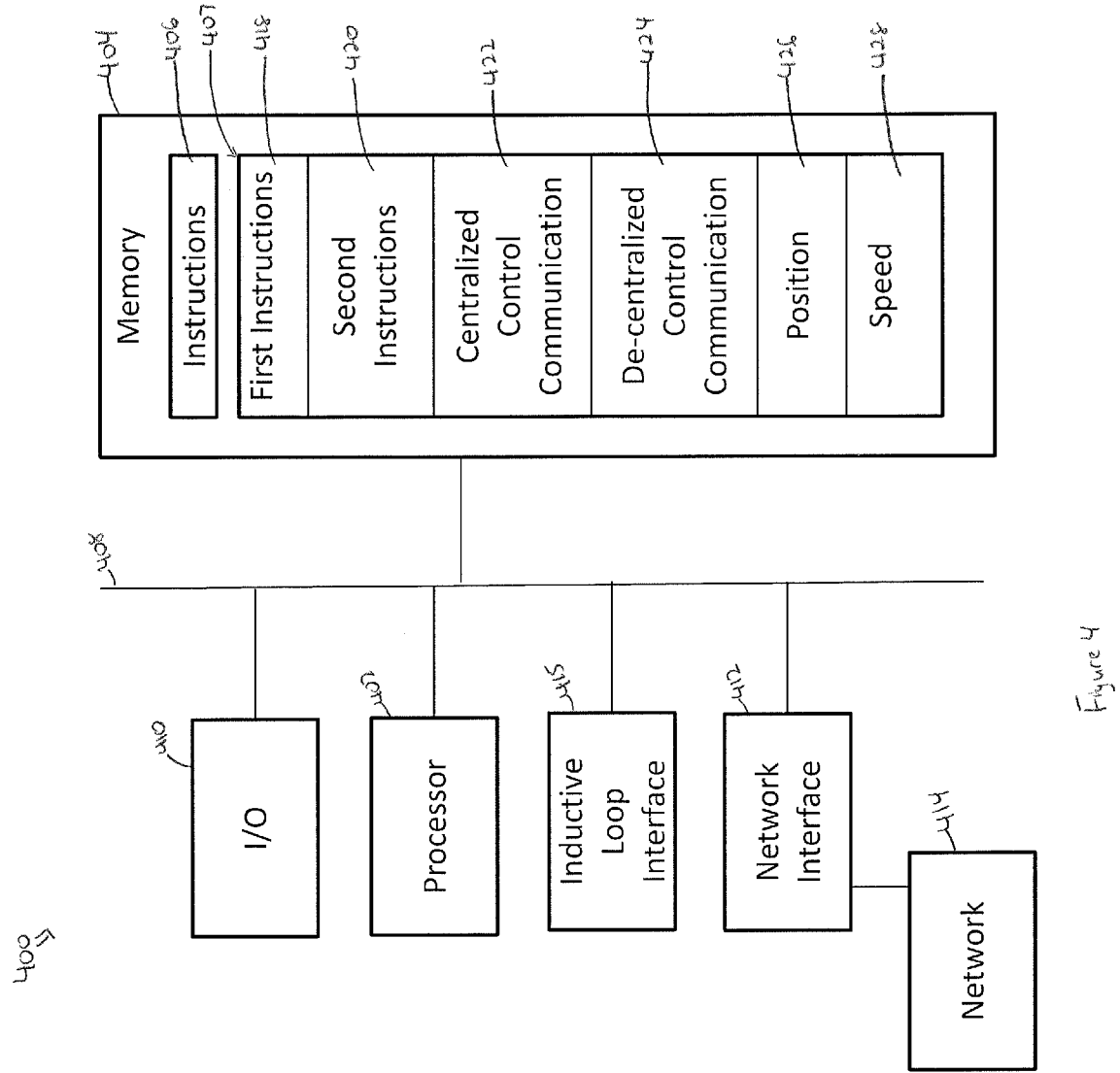
FIG. 4 is a block diagram of an on-board controller connected to the vehicle in accordance with one or more embodiments.

FIG. 4 is a block diagram of an on-board controller 400 in accordance with one or more embodiments. In some embodiments, on-board controller 400 is on-board controller 130 (FIG. 1). On-board controller 400 includes a hardware processor 402 and a non-transitory, computer readable storage medium 404 encoded with, i.e., storing, the computer program code 406, i.e., a set of executable instructions. Computer readable storage medium 404 is also encoded with instructions 407 for interfacing with elements of control system 100 (FIG. 1). The processor 402 is electrically coupled to the computer readable storage medium 404 via a bus 408. The processor 402 is also electrically coupled to an I/O interface 410 by bus 408. A network interface 412 is also electrically connected to the processor 402 via bus 408. Network interface 412 is connected to a network 414, so that processor 402 and computer readable storage medium 404 are capable of connecting and communicating to external elements via network 414. An inductive loop interface 415 is also electrically connected to the processor 402 via bus 408. Inductive loop interface 415 provides a diverse communication path from the network interface. In some embodiments, inductive loop interface 415 or network interface 412 are replaced with a different communication path such as optical communication, microwave communication, or other suitable communication paths. The processor 402 is configured to execute the computer program code 406 encoded in the computer readable storage medium 404 in order to cause on-board controller 400 to be usable for performing a portion or all of the operations as described with respect to control system 100, method 200 (FIG. 2) or method 300 (FIG. 3).

In some embodiments, the processor 402 is a central processing unit (CPU), a multi-processor, a distributed processing system, an application specific integrated circuit (ASIC), and/or a suitable processing unit.

In some embodiments, the computer readable storage medium 404 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the storage medium 404 stores the computer program code 406 configured to cause on-board controller 400 to perform the operations as described with respect to control system 100 (FIG. 1), method 200 (FIG. 2) or method 300 (FIG. 3). In some embodiments, the storage medium 404 also stores information needed for performing the operations as described with respect to control system 100, method 200 or method 300, such as a first set of instructions parameter 418, a second set of instructions parameter 420, a centralized control communication parameter 422, a de-centralized control communication parameter 424, a vehicle position parameter 426, a vehicle speed parameter 428 and/or a set of executable instructions to perform the operation as described with respect to control system 100, method 200 or method 300.

In some embodiments, the storage medium 404 stores instructions 407 for interfacing with external components. The instructions 407 enable processor 402 to generate operating instructions readable by the external components to effectively implement the operations as described with respect to control system 100, method 200 or method 300.

On-board controller 400 includes I/O interface 410. I/O interface 410 is coupled to external circuitry. In some embodiments, I/O interface 410 includes a keyboard, keypad, mouse, trackball, trackpad, and/or cursor direction keys for communicating information and commands to processor 402.

On-board controller 400 also includes network interface 412 coupled to the processor 402. Network interface 412 allows on-board controller 400 to communicate with network 414, to which one or more other computer systems are connected. Network interface 412 includes wireless network interfaces such as BLUETOOTH, WIFI, WIMAX, GPRS, or WCDMA; or wired network interface such as ETHERNET, USB, or IEEE-1394. In some embodiments, the operations as described with respect to control system 100, method 200 or method 300 are implemented in two or more on-board controllers 400, and information such as first set of instructions, second set of instructions, centralized control communication, de-centralized control communication, vehicle position and vehicle speed are exchanged between different on-board controllers 400 via network 414.

On-board controller 400 also includes inductive loop interface 415 coupled to the processor 402. Inductive loop interface 415 allows on-board controller 400 to communicate with external devices, to which one or more other computer systems are connected. In some embodiments, the operations as described with respect to control system 100, method 200 or method 300 are implemented in two or more on-board controllers 400, and information such as first set of instructions, second set of instructions, centralized control communication, de-centralized control communication, vehicle position and vehicle speed are exchanged between different on-board controllers 400 via inductive loop interface 415.

On-board controller 400 is configured to receive information related to the first set of instructions through I/O interface 410. The information is transferred to processor 402 via bus 408 to determine necessary adjustments to the vehicle speed. The first set of instructions are then stored in computer readable medium 404 as first set of instructions parameter 418. On-board controller 400 is configured to receive information related to the second set of instructions through I/O interface 410. The information is transferred to processor 402 via bus 408 to determine necessary adjustments to the vehicle speed. The second set of instructions are then stored in computer readable medium 404 as second set of instructions parameter 420. On-board controller 400 is configured to receive information related to centralized control communication through I/O interface 410. The information is stored in computer readable medium 404 as centralized control communication parameter 422. On-board controller 400 is configured to receive information related to de-centralized control communication through I/O interface 410. The information is stored in computer readable medium 404 as de-centralized control communication parameter 424. On-board controller 400 is configured to receive information related to vehicle position through I/O interface 410. In some embodiments, the vehicle position is determined by RFID tags on the guideway, a map stored in the computer readable medium 404, a global positioning system, or other suitable positioning device. The information is stored in computer readable medium 404 as vehicle position parameter 426. On-board controller 400 is configured to receive information related to vehicle speed through I/O interface 410. In some embodiments, the vehicle position is determined by an accelerometer, a tachometer, or other suitable speed detecting device. The information is stored in computer readable medium 404 as vehicle speed parameter 428.

During operation, processor 402 executes a set of instructions to determine whether to adjust the vehicle speed based on first set of instructions parameter 418 and second set of instructions parameter 420. During operation, processor 402 executes a set of instructions to determine whether the on-board controller 400 is experiencing an interruption in communication with either the centralized control or the de-centralized control.

One aspect of this description relates to a control system for a vehicle in a guideway network. The control system includes a centralized control system configured to generate a first set of instructions. The control system further includes at least one de-centralized control system configured to generate a second set of instructions. The control system further includes an on-board controller on the vehicle, the on-board controller configured to receive the first set of instructions and the second set of instructions during a same time period. The centralized control system is configured to transmit the first set of instructions to the on-board controller using a first communication technique. The at least one de-centralized control system is configured to transmit the second set of instructions to the on-board controller via a second communication technique different from the first communication technique.

Another aspect of this description relates to a method of operating a vehicle in a guideway network. The method includes receiving a first set of instructions from a centralized control system and receiving a second set of instructions from at least one de-centralized control system. The method further includes determining whether discrepancies exist between the first set of instruction and the second set of instructions, using an on-board controller. The method further includes implementing the first and second set of instructions if no discrepancy exists and implementing a least restrictive of the first set of instructions or the second set of instructions if a discrepancy exists.

Still another aspect of this description relates to a method of operation a vehicle in a guideway network. The method includes establishing communication, using an on-board controller, with a centralized control system and at least one de-centralized control system and determining whether communication is interrupted with either the centralized control system or the at least one de-centralized control system. If communication is not interrupted with either the centralized control system or the at least one de-centralized control system, the method includes receiving a first set of instructions from the centralized control system; receiving a second set of instructions from the at least one de-centralized control system; and implementing at least one of the first set of instructions or second set of instructions. If communication is interrupted with either the centralized control system or the at least one decentralized control system, the method includes receiving instructions from either the centralized control system or the at least one de-centralized control system; implementing the received instructions; and attempting to re-establish communication with either the centralized control system or the at least one de-centralized control system.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A control system for a vehicle in a guideway network, the control system comprising:
    a centralized control system configured to generate a first set of instructions;
    at least one de-centralized control system configured to generate a second set of instructions, wherein the at least one de-centralized control system is stationary; and
    an on-board controller on the vehicle, the on-board controller configured to receive the first set of instructions and the second set of instructions during a same time period,
    wherein the centralized control system is configured to transmit the first set of instructions to the on-board controller using a first communication technique and the at least one de-centralized control system is configured to transmit the second set of instructions to the on-board controller via a second communication technique different from the first communication technique,
    wherein the on-board controller is configured to implement the least restrictive of the first set of instructions or the second set of instructions.

2. The control system according to claim 1, wherein the centralized control system is configured to transmit the first set of instructions to the on-board controller using an inductive loop communication system and the at least one de-centralized control system is configured to transmit the second set of instructions to the on-board controller via a radio communication system.

3. The control system according to claim 1, wherein the centralized control system is configured to generate the first set of instructions using a first algorithm, the at least one de-centralized control system is configured to generate the second set of instructions using a second algorithm, and the first algorithm is independent and diverse from the second algorithm.

4. The control system according to claim 1, further comprising an automatic supervision system configured to provide routing information to the centralized control system and the at least one de-centralized control system.

5. The control system according to claim 4, wherein the automatic supervision system is connected to the at least one de-centralized control system via a network, and the automatic supervision system is connected to the centralized control system via a wired connection.

6. The control system according to claim 1, wherein the at least one de-centralized control system comprises:
    a first de-centralized control system having a first area of control; and
    a second de-centralized control system having a second area of control,
    wherein the first area of control and the second area of control overlap.

7. The control system according to claim 1, wherein the centralized control system is configured to generate the first set of instructions using a first algorithm, and the at least one de-centralized control system is configured to generate the second set of instructions using a second algorithm independent and diverse from the first algorithm.

8. The control system according to claim 1, wherein the on-board controller is configured to simultaneously receive the first set of instructions and the second set of instructions simultaneously.

9. The control system according to claim 1, wherein the on-board controller is configured to transmit a vehicle position and a vehicle speed to the centralized control system and to the at least one de-centralized control system.

10. The control system according to claim 1, wherein the on-board controller is configured to determine whether communication with one of the centralized control system or the at least one de-centralized control system is interrupted.

11. The control system according to claim 1, further comprising at least one set of field elements, wherein the at least one set of field elements is configured to collect data regarding the guideway and transmit the collected data to the at least one de-centralized control system, wherein each of the at least one set of field elements is associated with a respective at least one de-centralized control system.

12. A method of operating a vehicle in a guideway network, the method comprising:
    receiving a first set of instructions from a centralized control system;
    receiving a second set of instructions from at least one de-centralized control system, wherein the at least one de-centralized control system is stationary;
    determining whether discrepancies exist between the first set of instruction and the second set of instructions, using an on-board controller;
    implementing the first or second set of instructions if no discrepancy exists; and implementing a least restrictive of the first set of instructions or the second set of instructions if a discrepancy exists.

13. The method according to claim 12, wherein receiving the first set of instructions comprises receiving the first set of instruction via a first communication technique, and receiving the second set of instructions comprises receiving the second set of instructions via a second independent and diverse communication technique different from the first communication technique.

14. The method according to claim 12, further comprising transmitting vehicle position and speed information, using the on-board controller, to the centralized control system and the at least one de-centralized control system.

15. The method according to claim 12, wherein receiving the first set of instructions occurs simultaneously with receiving the second set of instructions.

16. A method of operation a vehicle in a guideway network, the method comprising:
  establishing communication, using an on-board controller, with a first control system and a second control system;
  determining whether communication is interrupted with either the first control system or the second control system;
  if communication is not interrupted with either the first control system or the second control system:
  receiving a first set of instructions from the first control system; receiving a second set of instructions from the second control system;
  implementing at least one of the first set of instructions or second set of instructions;
  if communication is interrupted with either the first control system or the second control system:
  receiving instructions from either the first control system or the second control system;
  implementing a least restrictive of the received instructions if a discrepancy exists; and
  attempting to re-establish communication with either the first control system or the second control system.

17. The method according to claim 16, wherein implementing at least one of the first set of instructions or second set of instructions comprises:
  determining whether discrepancies exist between the first set of instruction and the second set of instructions, using the on-board controller;
  implementing the first or second set of instructions if no discrepancy exists; and
  implementing a least restrictive of the first set of instructions or the second set of instructions if a discrepancy exists.

18. The method according to claim 16, wherein establishing communication comprises:
  establishing communication with the first control system using a first communication technique; and
  establishing communication with the second control system using a second communication technique different from the first communication technique.

19. The method according to claim 16, wherein if communication is interrupted with either the first control system or the second control system: receiving instructions from either the first control system or the second control system comprises seamlessly receiving the instructions without a physical switching over in the on-board controller.

* * * * *